(12) United States Patent
Nishida et al.

(10) Patent No.: US 7,468,852 B2
(45) Date of Patent: Dec. 23, 2008

(54) METHOD OF DEMAGNETIZING MAGNETIC RECORDING MEDIUM AND APPARATUS FOR CARRYING OUT SAME

(75) Inventors: Syuji Nishida, Kanagawa (JP); Ikuya Tagawa, Kanagawa (JP); Yasutaka Nishida, Tokyo (JP); Satoshi Tabata, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 181 days.

(21) Appl. No.: 11/417,812

(22) Filed: May 3, 2006

(65) Prior Publication Data

US 2006/0250716 A1 Nov. 9, 2006

(30) Foreign Application Priority Data

May 6, 2005 (JP) ............................... 2005-135261

(51) Int. Cl.
*G11B 5/09* (2006.01)
(52) U.S. Cl. ......................................... 360/66; 360/15
(58) Field of Classification Search .................... 360/17
See application file for complete search history.

(56) References Cited

U.S. PATENT DOCUMENTS

| | | | |
|---|---|---|---|
| 5,132,860 A * | 7/1992 | Von Stein | 360/118 |
| 6,594,099 B2 | 7/2003 | Serizawa | |
| 6,747,823 B2 * | 6/2004 | Saito et al. | 360/17 |
| 6,954,317 B2 * | 10/2005 | Aoki et al. | 360/17 |
| 7,079,345 B1 * | 7/2006 | Nguy et al. | 360/66 |
| 2008/0002292 A1 * | 1/2008 | Le et al. | 360/125 |

FOREIGN PATENT DOCUMENTS

| | | |
|---|---|---|
| EP | 0546312 A1 | 6/1993 |
| JP | 05-258210 | 10/1993 |
| JP | 08-138203 | 5/1996 |
| JP | 2002-163801 | 6/2002 |

* cited by examiner

*Primary Examiner*—Andrea L Wellington
*Assistant Examiner*—Varsha A. Kapadia
(74) *Attorney, Agent, or Firm*—Townsend and Townsend and Crew LLP; Rambod Nader

(57) ABSTRACT

Embodiments of the invention improve efficiency in alternating-current demagnetization of a magnetic recording medium. In specific embodiments, magnet fields in a direction slanting to an easy direction of magnetization of recording layer magnetization of a medium in rotation are applied.

19 Claims, 14 Drawing Sheets

Magnetic Field

METHOD OF DEMAGNETIZING MAGNETIC RECORDING MEDIUM AND APPARATUS FOR CARRYING OUT SAME

CROSS-REFERENCES TO RELATED APPLICATIONS

This application claims priority from Japanese Patent Application No. JP2005-135261, filed May 6, 2005, the entire disclosure of which is incorporated herein by reference.

BACKGROUND OF THE INVENTION

The invention relates to a method of demagnetizing a magnetic recording medium, for use in a magnetic recorder, and an apparatus for carrying out the same.

In magnetic recording, magnetic fields leaking from a medium affect a head magnetic field, and a head, thereby inducing a transition shift, and shift in the baseline of a reproducing waveform at the time of recording and reproducing. As a result, there occurs deterioration of not only an error rate in a data region, but also write/read characteristics of information for a servo. Such a phenomenon as described occurs regardless of whether it is the case of a longitudinal magnetic recording system or the case of a perpendicular magnetic recording system, but in the case of the perpendicular magnetic recording system, in particular, leaking fluxes from the medium are prone to act on the head, having a significant effect thereon. In order to avoid occurrence of the phenomenon, it becomes necessary to render remanent magnetization zero by causing the medium to undergo alternating-current demagnetization.

In the past, alternating-current demagnetization for rendering the remanent magnetization zero has been implemented by disposing permanent magnets or electromagnets such that magnetic fields differing in polarity from each other, in the longitudinal direction of a recording layer, that is, an easy direction of magnetization thereof, can be applied to the recording layer, and by moving the permanent magnets away from the medium, or gradually reducing respective current values of the electromagnets while applying the magnetic fields produced by the permanent magnets, or the electromagnets to the medium in rotation, in the case of, for example, the longitudinal recording system. In this process, the magnetic fields applied to the recording layer of the medium are gradually decreased in strength while respective polarities thereof are reversed from each other, and as a result, the magnetization of the recording layer is gradually turned into a zero-magnetization state while the recording layer repeating magnetization reversal, thereby attaining alternating-current demagnetization. With the perpendicular magnetic recording medium as well, there is adopted a magnet configuration such that magnetic fields differing in polarity from each other, in a direction normal to a medium plane, that is, the direction of the easy axis of magnetization of a recording layer, can be similarly applied to the recording layer, and by gradually decreasing respective strengths of the magnetic fields as applied, alternating-current demagnetization can be implemented. Such a system for causing a medium to undergo alternating-current demagnetization has been described in JP-A No. 2001-331904, and JP-A No. 2002-133603, respectively. Further, in JP-A No. 2002-163801, there has been described a structure where magnets are disposed in staggered positions, respectively.

BRIEF SUMMARY OF THE INVENTION

As described in the foregoing, in order to demagnetize magnetic recording media, it is necessary to apply the magnetic fields in the direction of the easy axis of magnetization of the recording layer, and the magnetic fields to be applied need to have sufficiently high strengths in relation to magnetic coercivity of the media. However, there have been continuing tendencies in media designing in recent years to increase magnetic coercivity of the recording layer for the purpose of decreasing thermomagnetic mitigation, so that it has become difficult to implement a demagnetizing apparatus capable of applying magnetic fields of strength sufficient for demagnetization. With a method disclosed in JP-A No. 2002-163801, decreasing AC magnetic fields do not exist because there is no rotational movement of a medium, so that alternating-current demagnetization cannot be implemented.

It is therefore a feature of the invention to provide a method of demagnetizing a magnetic medium, excellent in demagnetization efficiency, and capable of coping with an increase in coercive force of media, expected in the future, and an apparatus for carrying out the same.

With the invention, taking into account a magnetization reversal mechanism, there is adopted a magnet configuration such that magnet fields in a direction slanting to the direction of the easy axis of magnetization of a recording layer are applied. According to a numerical analysis based on a magnetization reversal model for single domain particles of a uniaxial anisotropy, strength of magnetization reversal magnetic field is dependent on an angle between the magnetic field, and the direction of the easy axis of magnetization thereof, and as shown in FIG. 1, when the magnetic field is applied at 45° against the easy axis of magnetization, magnetization reversal occurs at half a magnetic field strength for the case where the magnetic field is applied to the direction of the easy axis of magnetization. The easy axis of magnetization of the recording layer is oriented in a direction normal to a medium plane in the case of a perpendicular magnetic recording medium, and the same is oriented in a direction parallel with the medium plane in the case of a longitudinal magnetic recording medium. The coercive force of media is generally defined as a magnetic field strength at which magnetization is rendered zero when a magnetic field is applied to the direction of the easy axis of magnetization of the recording layer, and in order to reverse the magnetization of the recording layer, the magnetic field to be applied needs to have a strength sufficiently higher than the coercive force of a medium. Since the magnetic recording medium is an aggregate of the single domain particles, the coercive force becomes effectively smaller in the magnet fields in the direction slanting to the direction of the easy axis of magnetization of the magnetic recording medium.

With the invention, use is made of a magnet field angle in the range of about 15 to 75 degrees against the direction of the easy axis of magnetization, which is highly efficient in magnetization reversal (refer to FIG. 1). More specifically, with two magnets disposed on the top side, and underside of the medium plane, respectively, so as to be arranged in a track direction, the respective magnets on the top side, and the underside, making a pair, and differing in polarity, are disposed in such a way as to be staggered from an identical position on the medium plane. By the agency of the respective magnets in pairs, disposed so as to be staggered from each other, the magnet fields tilted from the direction normal to the medium plane can be applied to the recording layer of the medium, and by the agency of the magnets whose polarities reversed from each other that are disposed on the medium plane so as to be arranged in the track direction, slanted magnetic fields whose polarities differ from each other can be alternately applied when the medium is rotated. Owing to the slanted magnetic fields that are alternately applied, magnetization reversal in the medium with a high coercive force can be implemented with high efficiency in comparison with the case of a conventional apparatus, and by gradually decreasing strengths of the slanted magnetic fields, alternating-current demagnetization can be achieved.

In the case of effecting alternating-current demagnetization of the perpendicular magnetic recording medium, magnetic fields with alternate polarity are preferably applied so as to be tilted by about 15 to 75 degrees toward the track direction from the direction normal to the medium plane. The magnetic fields with alternate polarity may be produced by magnets in pairs of not less than two pairs, disposed with the medium plane sandwiched therebetween, so as to form an angle in the range of about 15 to 75 degrees between a straight line interconnecting the respective centers of two magnetic pole faces of the magnets opposite to each other, and the normal to the medium plane, the magnets being disposed so as to be arranged in a rotation direction of the medium such that polarities of respective magnet fields applied to the perpendicular magnetic recording medium are reversed from each other.

In the case of effecting alternating-current demagnetization of the longitudinal magnetic recording medium, the magnetic fields with alternate polarity are preferably applied so as to be tilted by about 15 to 75 degrees from the direction normal to the medium plane. The magnetic fields with alternate polarity may be produced by magnets in pairs of not less than two pairs, disposed with the medium plane sandwiched therebetween, so as to form an angle in the range of about 15 to 75 degrees between a straight line interconnecting the respective centers of two magnetic pole faces of the magnets opposite to each other, and the normal to the medium plane, the magnets being disposed so as to be arranged in the rotation direction of the medium such that polarities of respective magnet fields applied to the longitudinal magnetic recording medium are reversed from each other.

The method of demagnetizing a magnetic recording medium, according to the invention, or an apparatus for carrying out the same, according to the invention may be applied to a fabrication process for magnetic recording media With the invention, it is possible to efficiently implement alternating-current demagnetization of the magnetic recording media, and with the use of the media subjected to the alternating-current magnetic demagnetization according to the invention, it is possible to avoid occurrence of problems in the course of recording and reproduction,

DETAILED DESCRIPTION OF THE INVENTION

Embodiments of the invention are described hereinafter with reference to the accompanying drawings.

Figure 28:
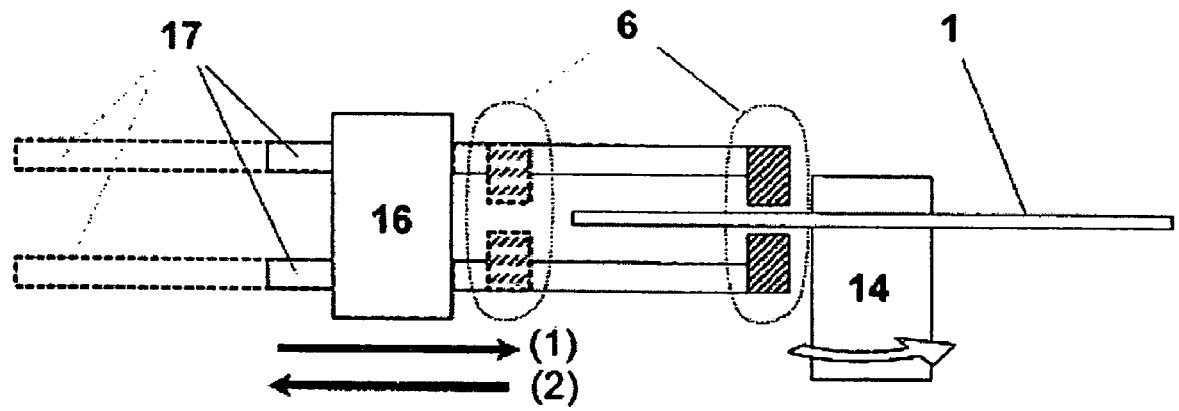
FIG. 28 is a schematic diagram showing an apparatus for demagnetization.

FIG. 28 is a schematic diagram showing an apparatus for demagnetization of a magnetic recording medium, according to an embodiment of the invention. The apparatus for demagnetization of a magnetic recording medium comprises permanent magnets 6 attached to magnet supporting bars 17, respectively, a magnet driver 16 for causing the respective permanent magnets 6 to move from side to side in the figure, and is made up with a magnetic recording medium 1 to be demagnetized, and a spindle motor 14 for rotating the magnetic recording medium 1. Respective positions of the permanent magnets 6, and the magnet supporting bars 17, indicated by broken lines, are respective initial positions.

Figure 2:
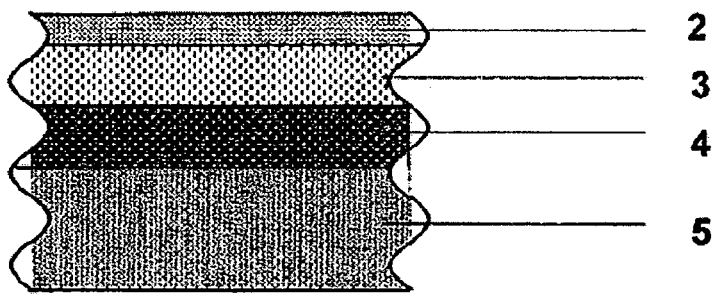
FIG. 2 is a sectional schematic diagram showing a film structure of a double-layered perpendicular magnetic recording medium.
Figure 3:
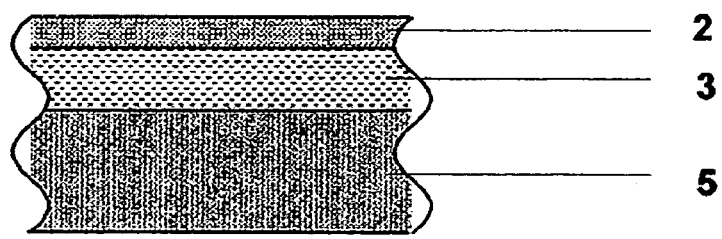
FIG. 3 is a sectional schematic diagram showing a film structure of a longitudinal magnetic recording medium.

The magnetic recording medium 1 is a disk made of constituent materials such as glass, aluminum, a magnetic material, and so forth. FIG. 2 is a sectional schematic diagram showing a film structure of a double-layered perpendicular magnetic recording medium, and FIG. 3 is a sectional schematic diagram showing a film structure of a longitudinal magnetic recording medium. The double-layered perpendicular magnetic recording medium has a structure wherein a soft magnetic under layer 4, a hard magnetic recording layer 3, and a nonmagnetic protection layer 2 are stacked in that order on top of a nonmagnetic substrate 5. The longitudinal magnetic recording medium has a structure wherein a hard magnetic recording layer 3, and a nonmagnetic protection layer 2 are stacked in that order on top of a nonmagnetic substrate 5. The double-layered perpendicular magnetic recording medium as well as the longitudinal magnetic recording medium generally has a film structure symmetrical to the above-described structure, and disposed on the underside of the substrate 5, in the figure, although not shown in the figure. Further, an easy direction of magnetization of the recording layer coincides with a direction normal to the medium plane in the case of the perpendicular magnetic recording medium, and the direction of the easy axis of magnetization of the recording layer coincides with a direction parallel with the medium plane in the case of the longitudinal magnetic recording medium. The invention is intended to cause the respective recording layers of these magnetic recording media to undergo alternating-current magnetic demagnetization.

A procedure for demagnetization of the magnetic recording medium by use of the apparatus for demagnetization, shown in FIG. 28, comprises the following steps of:

(1) attaching the magnetic recording medium 1 to the spindle motor 14 so as to be secured thereto;

(2) rotating the spindle motor 14;

(3) causing the magnet driver 16 to move the magnet supporting bars 17 in the rightward direction (1) in the figure to thereby move the permanent magnets 6 at the respective positions indicated by the broken lines up to respective positions indicated by solid lines;

(4) causing the magnet driver 16 to move the magnet supporting bars 17 in the leftward direction (2) in the figure to thereby move the permanent magnets 6 up to the respective initial positions indicated by the broken lines;

(5) stopping rotation of the spindle motor 14; and (6) removing the magnetic recording medium 1.

Figure 4:
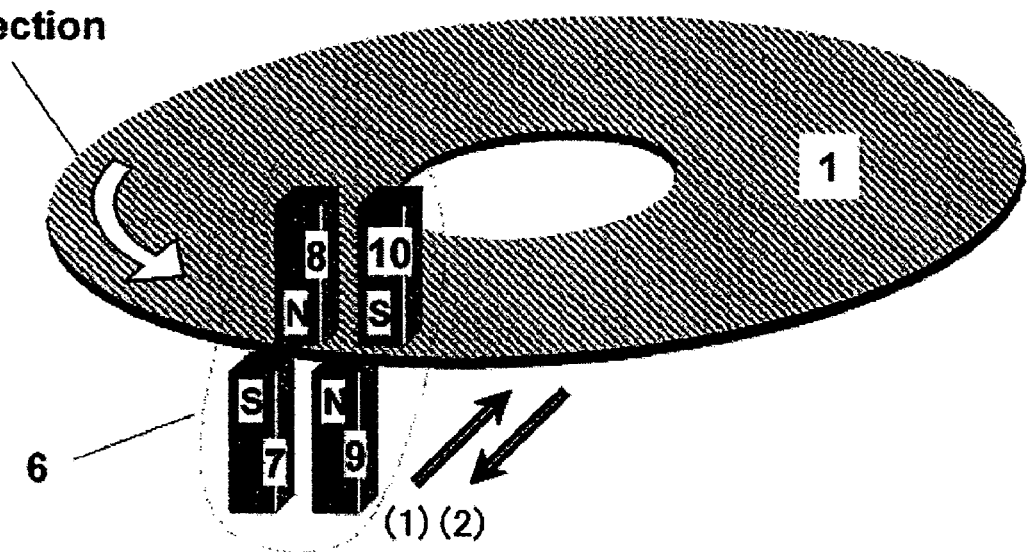
FIG. 4 is a schematic view of an apparatus for demagnetization, according to an embodiment of the invention.
Figure 5:
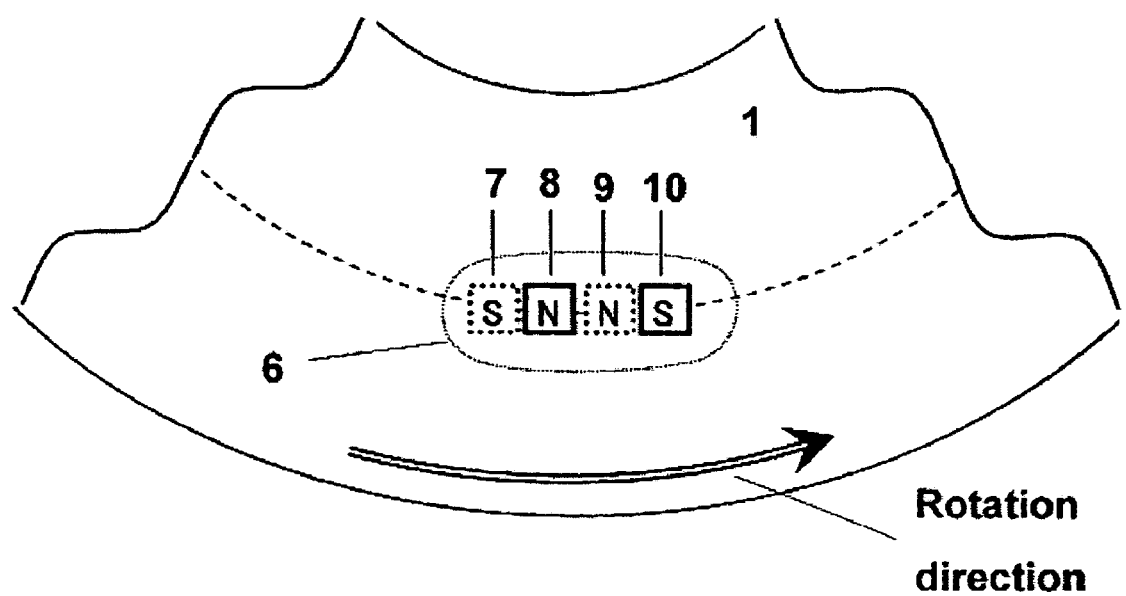
FIG. 5 is an enlarged schematic diagram of the apparatus for demagnetization as seen from the top face side of the medium.

By taking the steps (1) to (6) as above, demagnetization of the magnetic recording medium 1 is implemented FIG. 4 is a schematic view showing disposition of the magnets of the apparatus for demagnetization of the perpendicular magnetic recording medium, according to the invention. A permanent magnet group 6 comprising permanent magnets 7, 8, 9, and 10 is disposed in such a way as to sandwich the magnetic recording medium 1 therebetween. FIG. 5 is an enlarged schematic diagram showing the disposition of the magnets, shown in FIG. 4, as seen from the top face side of the medium. In the figure, S(7, 10) and N(8, 9), enclosed by a square, respectively, are magnetic poles of the respective magnets, indicating polarities at the ends of the respective magnets, opposite to a medium plane, and the squares (8, 10) defined by the solid lines, respectively, indicate that those magnets are disposed on the top side of the medium plane while the squares (7, 9) defined by the broken lines, respectively, indicate that those magnets are disposed on the underside of the medium plane. Thus, with two pieces of the magnets disposed so as to be arranged in a track direction on the top face, and underside face of the medium, respectively, the respective magnets on the top face, and underside face of the medium, having polarities differing from each other, and making a pair, are disposed so as to be staggered in the track direction from an identical position of the medium plane.

Figure 6:
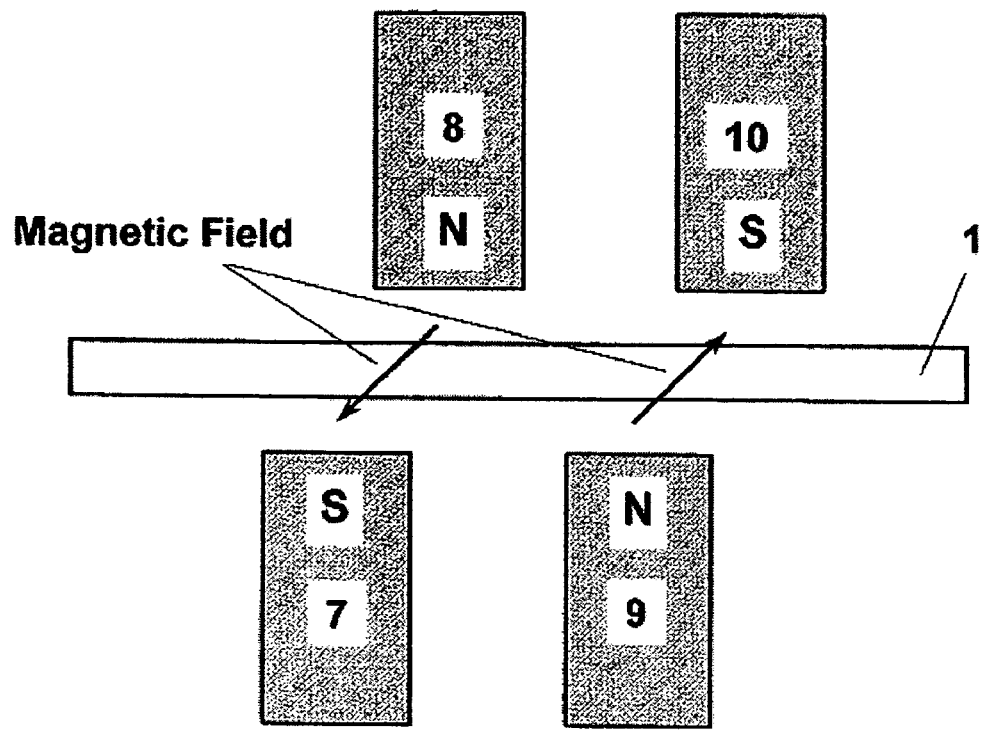
FIG. 6 is a schematic diagram of the apparatus for demagnetization as seen from a side face side thereof.

Further, FIG. 6 is a schematic diagram of the disposition of the magnets, as seen from a side face side of the medium. The permanent magnets 7, 8 as well as the permanent magnets 9, 10, disposed on the underside and top-side of the medium 1, making a pair, respectively, are disposed at positions staggered from each other in the track direction.

Figure 7:
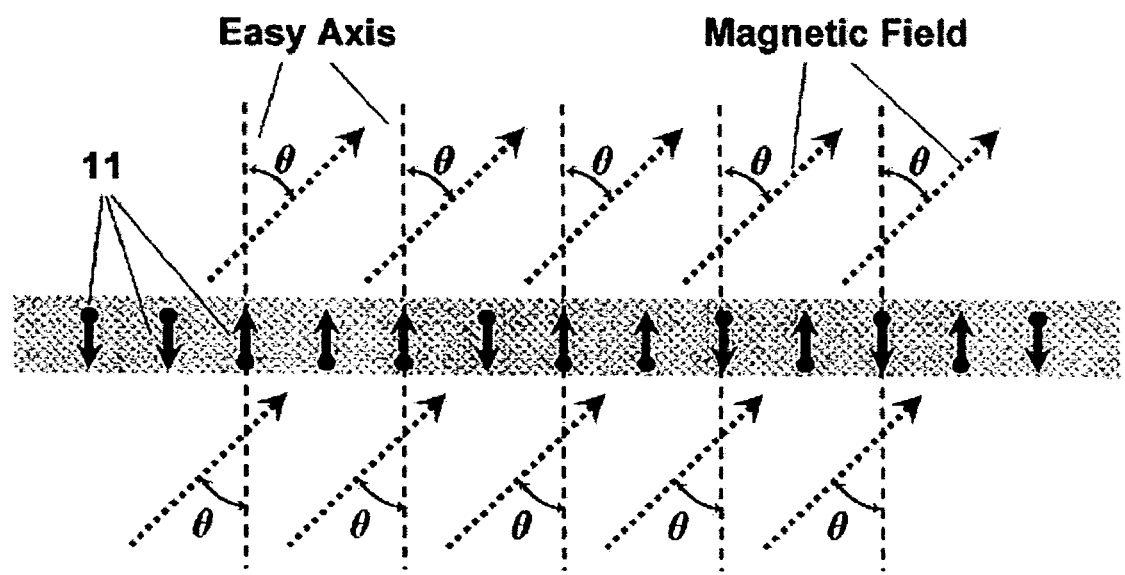
FIG. 7 is a schematic illustration of slanted magnetic fields applied to the perpendicular magnetic recording medium, according to an embodiment of the invention.
Figure 8:
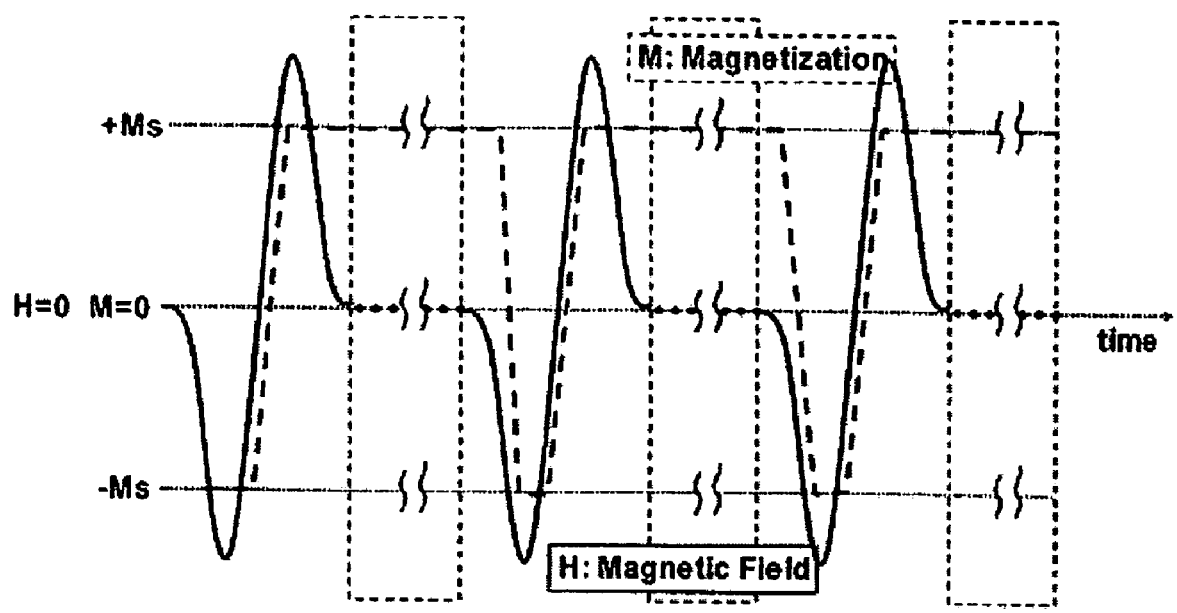
FIG. 8 is a schematic view showing the magnetic fields applied, and changes in magnetization of the medium over time while the medium is rotated.
Figure 9:
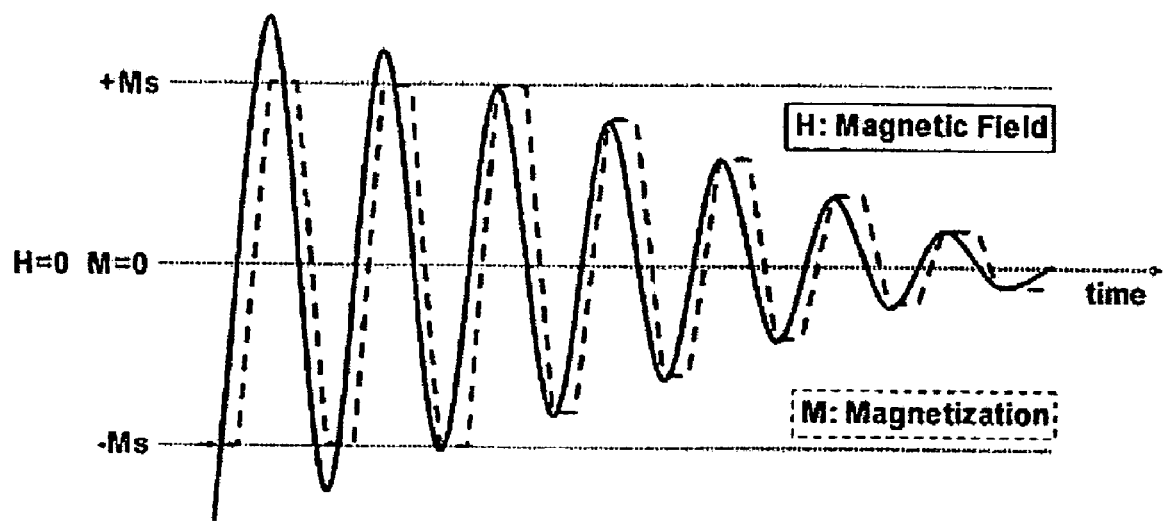
FIG. 9 is a diagram showing the magnetic fields applied, and changes in magnetization of the medium over time while the medium is rotated, and magnets are moved.

By the agency of the magnets disposed so as to be staggered between upside and downside magnets with the medium 1 sandwiched therebetween, as described above, magnetic fields slanting against the easy axis of magnetization of recording layer magnetization 11 are applied to the magnetic recording medium 1, as shown in FIG. 7. Upon rotation of the medium, portions of the medium, at respective positions, keep receiving a hysteresis of a slanted magnetic field whose polarity alternately changes, as shown in FIG. 8, by the agency of the two pairs of the permanent magnets 7, 8 and the permanent magnets 9, 10, with respective polarities being reversed from each other. In FIG. 8, respective rectangular regions defined by broken lines represent time that has elapsed from passage of the medium through a range of the magnetic field applied by the permanent magnet group 6 before reaching a magnetic field region again after one cycle, and during such a period of time, the magnetic field is not applied, so that magnetization of the medium does not change. Thereafter, by moving the permanent magnet group 6 from a position on the outer side of the medium 1 toward a position on the innermost periphery thereof, as shown by an arrow (1) in FIG. 4, and subsequently, moving the permanent magnet group 6 from the position on the innermost periphery of the medium 1 toward the position on the outer side thereof, as shown by an arrow (2), the magnetic field that is applied to the portions of the medium, at the respective positions, becomes weaker as the permanent magnet group 6 moves farther away, and the medium receives a magnetic field hysteresis as shown in FIG. 9, whereupon remanent magnetization gradually approaches zero. The rectangular regions defined by the broken lines, shown in FIG. 8, where the magnetic field of the permanent magnets is not applied, are omitted in the illustration in FIG. 9. The entire medium plane is caused to pass through the permanent magnet group 6 by operation as shown by the arrow (2) in FIG. 4, thereby enabling uniform alternating-current demagnetization to be implemented across the medium plane.

Figure 10:
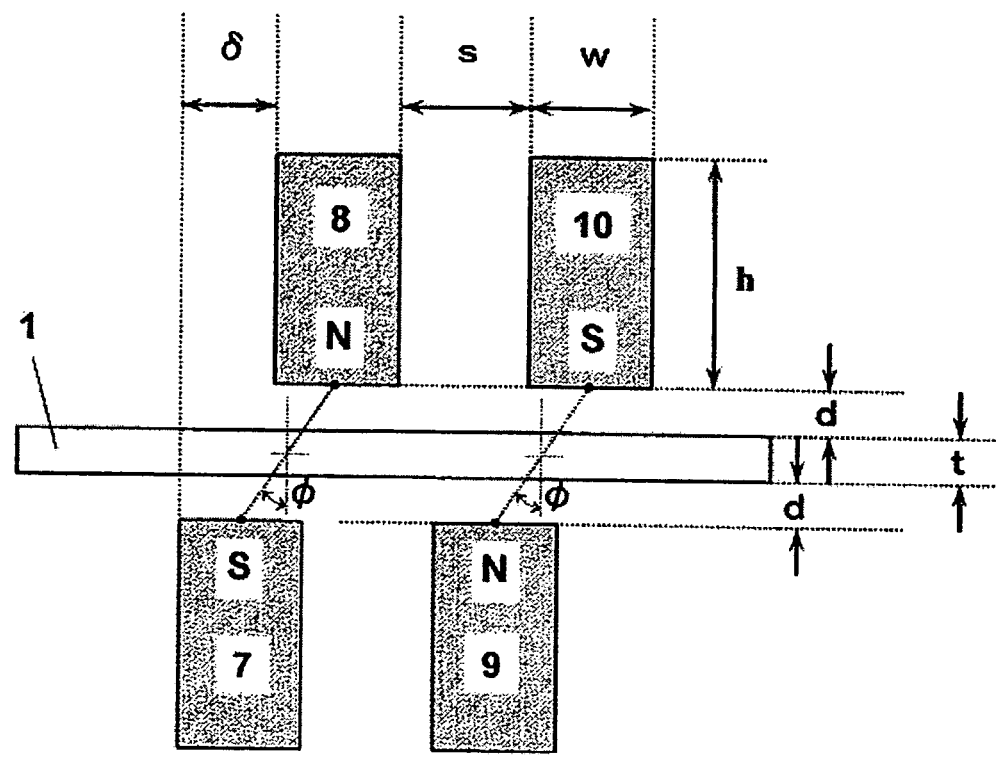
FIG. 10 is a schematic diagram showing detailed dimensions of the magnets for demagnetization.

In FIGS. 10 to 14, and FIGS. 26 and 27, there is shown superiority of demagnetization implemented through utilization of the slanted magnetic fields by the disposition of the magnets, according to the invention with the use of results of estimation by a numerical analysis using a finite element method, made on magnetic fields applied to the medium, FIG. 10 is a schematic diagram showing conditions of the analysis. Permanent magnets each having width w=2.0 (mm), height h=5.0 (mm), and Br=1.5 (T) are disposed at an interval s=5.0 (mm) at respective positions away by a spacing d=0.3 (mm) from a medium 1 with thickness t=0.64 (mm), and relative positions of the permanent magnets disposed on the top side of the medium against those on the underside thereof, respectively, are provided with an offset δ. Further, assuming that an angle formed between a straight line interconnecting the centers of the respective faces of the permanent magnets disposed on the top side, and underside of the medium, facing a medium plane, and a direction normal to the medium plane is defined as Φ, Φ=arctan {δ/(2d+t)}(deg.). In the analysis, assuming that the center in the lateral direction in the figure was defined as position 0, distribution of magnetic fields applied to the magnetic recording layer 3 of the medium was thereby found. The respective permanent magnets were magnetized in the perpendicular direction, and two pieces of the permanent magnets (7, 8) on the left-hand side were of the same polarity (S at the upper end, and N at the lower end), and two pieces of the permanent magnets (9, 10) on the right-hand side were of polarity reversed from that for the former (N at the upper end, and S at the lower end). In this case, on the assumption that the medium 1 was the double-layered perpendicular magnetic recording medium, the analysis was made assuming that the medium 1 had the soft magnetic under layer 4; however, because the soft magnetic under layer 4 undergoes complete magnetic saturation in regions where the magnetic fields produced by the magnets are applied, the soft magnetic under layer 4 has hardly any effect on results of an analysis. Accordingly, the results of the present analysis hold regardless of varieties of the medium.

Figure 1:
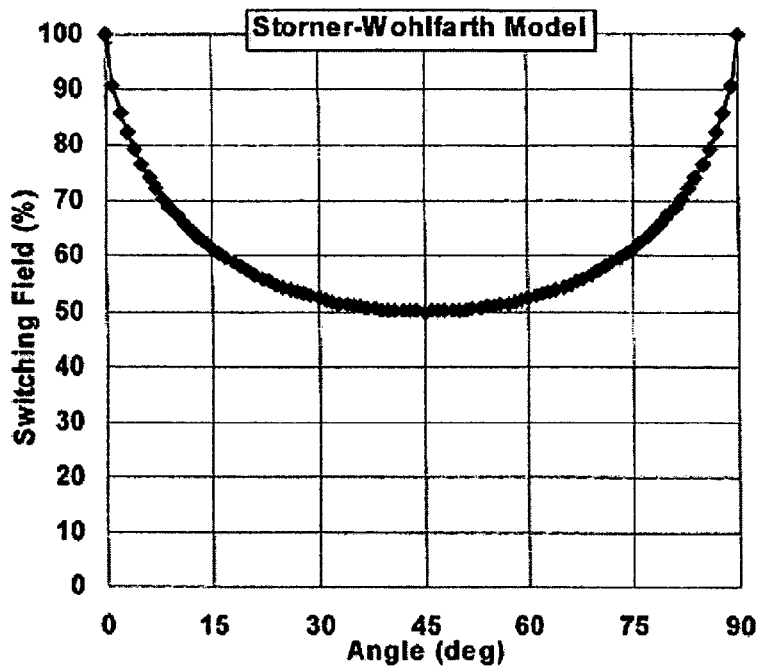
FIG. 1 is a graph showing magnetization reversal magnetic field's dependence on angles (Stoner-Wohlfarth model)
Figure 11:
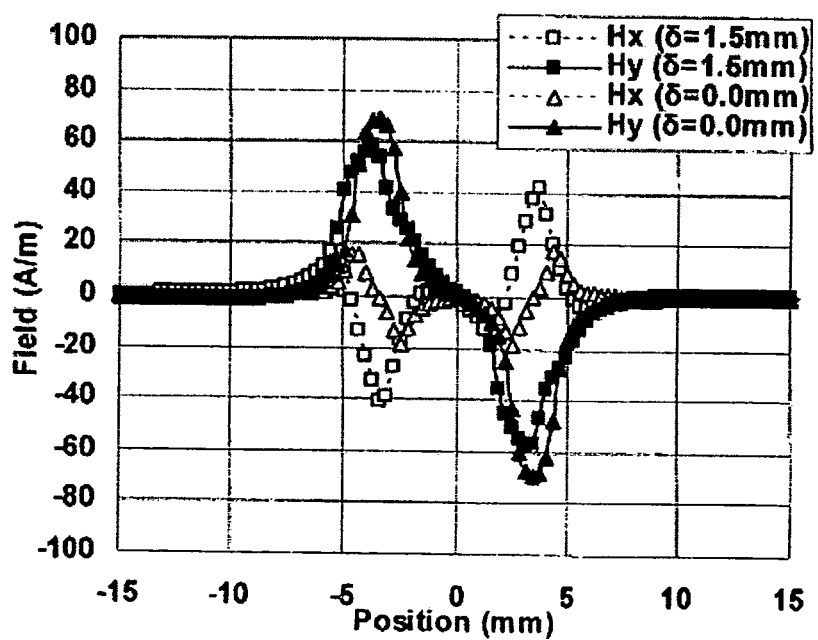
FIG. 11 is a graph showing distribution of the magnetic fields applied to the recording layer of the medium by the apparatus for demagnetization.
Figure 12:
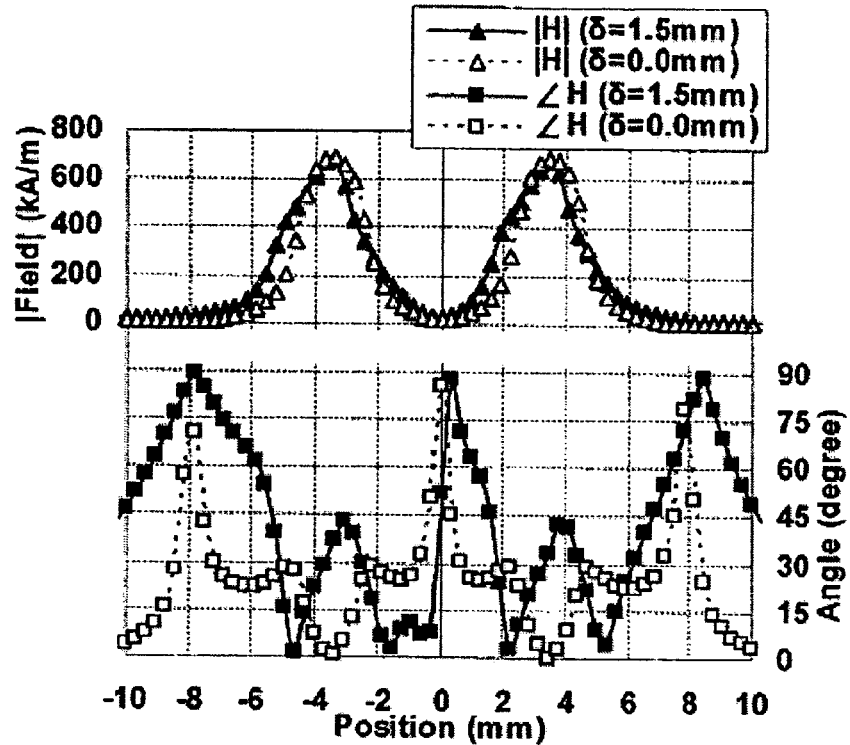
FIG. 12 is a graph showing strength of the magnetic fields applied to the recording layer of the medium, and angle distribution.
Figure 13:
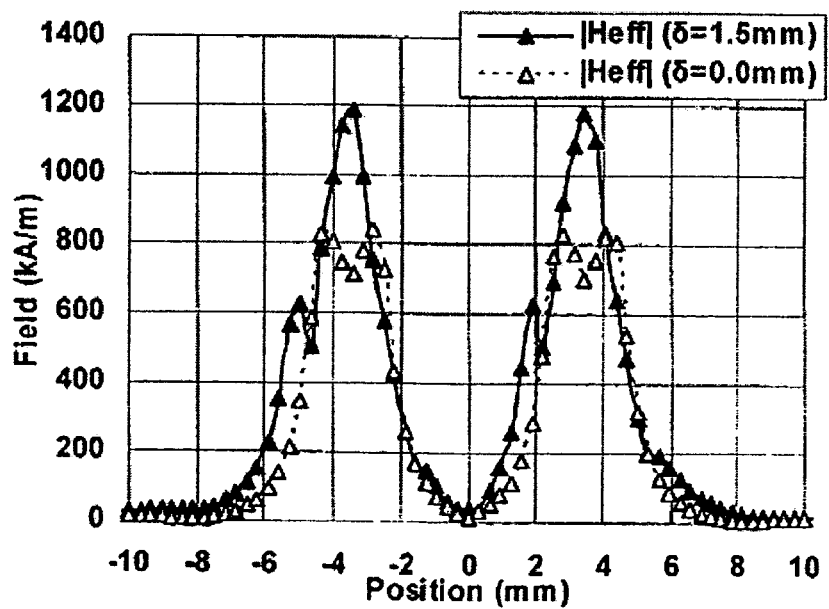
FIG. 13 is a graph showing distribution of effective magnetic field applied to the recording layer of the medium.

FIG. 11 is a graph showing distribution of magnetic fields applied to the magnetic recording layer 3 of the medium in the case where no offset ($\delta$=0.0 mm) exists, and in the case where an offset $\delta$=1.5 mm is provided. Based on FIG. 11, it can be confirmed that a magnetic field component Hy, perpendicular to the medium plane, when the offset is provided, decreases in comparison with that when no offset exists, but a longitudinal magnetic field component Hx, parallel with the medium plane, increases. FIG. 12 is a graph showing results of magnetic field strength |H| at respective positions in the above cases, and respective angles $\angle$H of magnetic fields applied to the medium, at those positions, from the direction normal to the medium plane. Based on FIG. 12, it can be confirmed that in contrast with a case where magnetic fields applied each have a component perpendicular to the medium, $\angle$H=0 (deg.), at positions of ±3.5 (mm), when no offset exists, the magnetic fields applied become slanted magnetic fields on the order of $\angle$H=40 (deg.) when the offset is provided, FIG. 13 is a graph showing results of effective magnetic field strength for reversing magnetization of the medium by taking into consideration a magnetization model's dependence on angles, as shown in FIG. 1. More specifically, the reciprocals of respective ratios of reversed magnetic fields, as shown in FIG. 1, at angles of respective positions, are multiplied by magnetic field strengths at the respective positions. Based on FIG. 13, it can be confirmed that when the offset is provided, the effective magnetic field strength is increased to 1200 kA/m, about 1.5 times the same at 800 kA/m when no offset exists.

Figure 14:
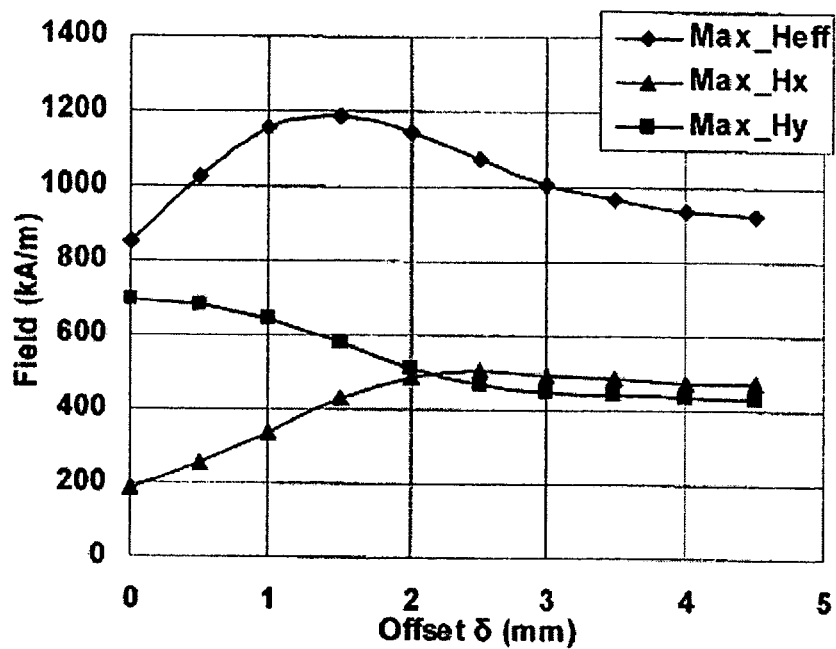
FIG. 14 is a graph showing the effective magnetic field's dependence on offset values.

FIG. 14 shows respective maximum values of a perpendicular magnetic field component Hy, longitudinal magnetic field component Hx, and an effective magnetic field Heff taking into consideration respective angles of magnetic fields applied when varying an offset value. As shown in FIG. 14, when the offset value is increased up to $\delta$=about 1.5 mm, the perpendicular magnetic field component continues to decrease, but the longitudinal magnetic field component continues to increase, and at $\delta$=1.5 (mm), the effective magnetic field comes to have a peak value. When the offset is further increased, the perpendicular component becomes substantially equal in magnitude to the longitudinal component, and the respective angles of the magnetic fields applied will be on the order of 45 degrees at which the magnetic fields are reversed efficiently. However, since strengths themselves of the perpendicular component, and the longitudinal component, respectively, decrease, the effective magnetic field as well decreases. For this reason, it becomes important in carrying out the present invention to select an offset value for maximizing the effective magnetic field taking into consideration a magnetic field strength and an angle at which the magnetic fields are applied.

Figure 26:
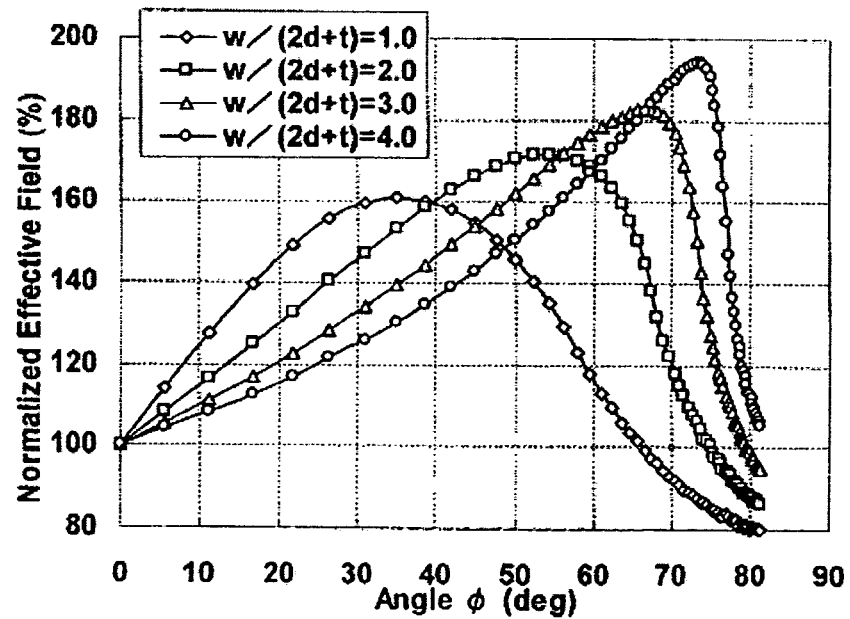
FIG. 26 is a graph showing dependence of strengths of the effective magnetic fields applied to the recording layer of the medium on magnetic pole staggering angles.
Figure 27:
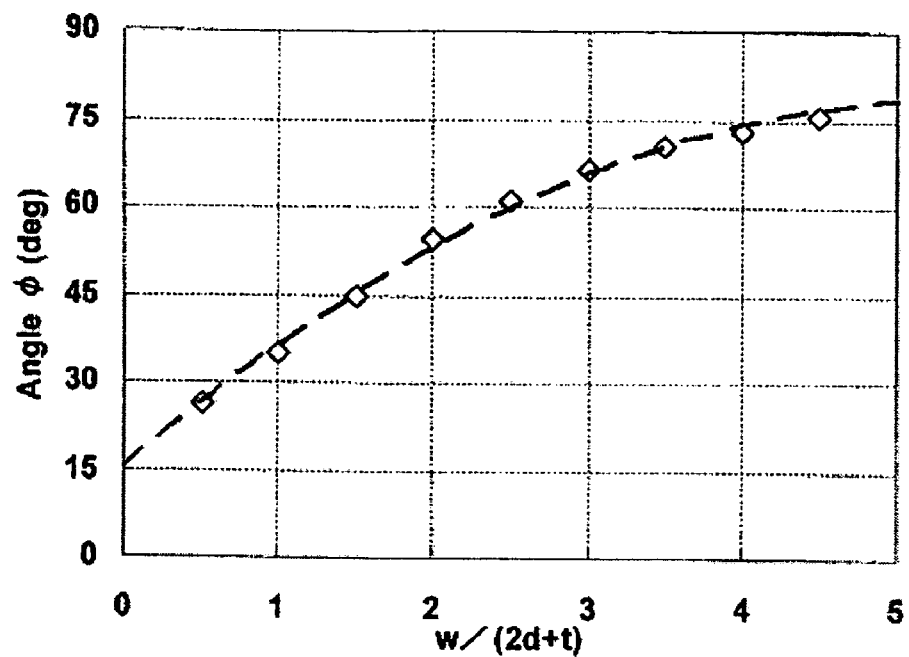
FIG. 27 is a graph showing an optimum magnetic pole staggering angle's dependence on the shape of a magnetic pole.

FIG. 26 is a graph showing the effective magnetic field strength's dependence on a magnetic pole staggering angle $\Phi$={the offset value $\delta$={(2d+t)tan($\Phi$)} when varying a configuration of the width w of each of the magnets, and a distance 2d+t (the thickness: t, the spacing from the medium: d) between the magnets disposed on the top side, and underside, respectively. There are shown strengths of the effective magnetic field, after standardized on an effective magnetic field strength in the case of no offset ($\Phi$=0.0 deg., $\delta$=0.0 mm). The effective magnetic field strength in relation to magnitude of the magnetic pole staggering angle is determined substantially by a ratio of w to (2d+t). There is variation in optimum value of $\Phi$ at which the effective magnetic field is at the maximum according to the ratio of w to (2d+t); however, it can be confirmed in any case that improvement in the effective magnetic field strength by suitably staggering the respective magnetic poles, on the top side, and underside, from each other, as compared with the case where those magnetic poles are not staggered. Further, FIG. 27 is a graph showing an optimum magnetic pole staggering angle's dependence on the ratio of w to (2d+t), and based on the figure, it can be confirmed that an optimum magnetic pole staggering angle $\Phi$ is not less than 15 degrees against any of the ratios of w to (2d+t). Further, an approximate curve of the optimum value of $\Phi$ can be expressed by approximate expression:

$$\Phi = -2.1\,R^2 + 23.1R + 15.3 \quad \{R = w \text{ to } (2d+t)\}$$

The optimum value is deemed to exist in a range of ±about 15 deg. from $\Phi$ found from the approximate expression although there is anticipated deviation of the optimum value, from the approximate expression, according to an actual magnet structure, and a magnetic pole material.

In order to apply a high magnetic field strength, it is conceivable to employ a magnet configuration in combination with a soft magnetic material larger in Bs than the permanent magnet. Even in such a case, the present invention is similarly effective.

Figure 15:
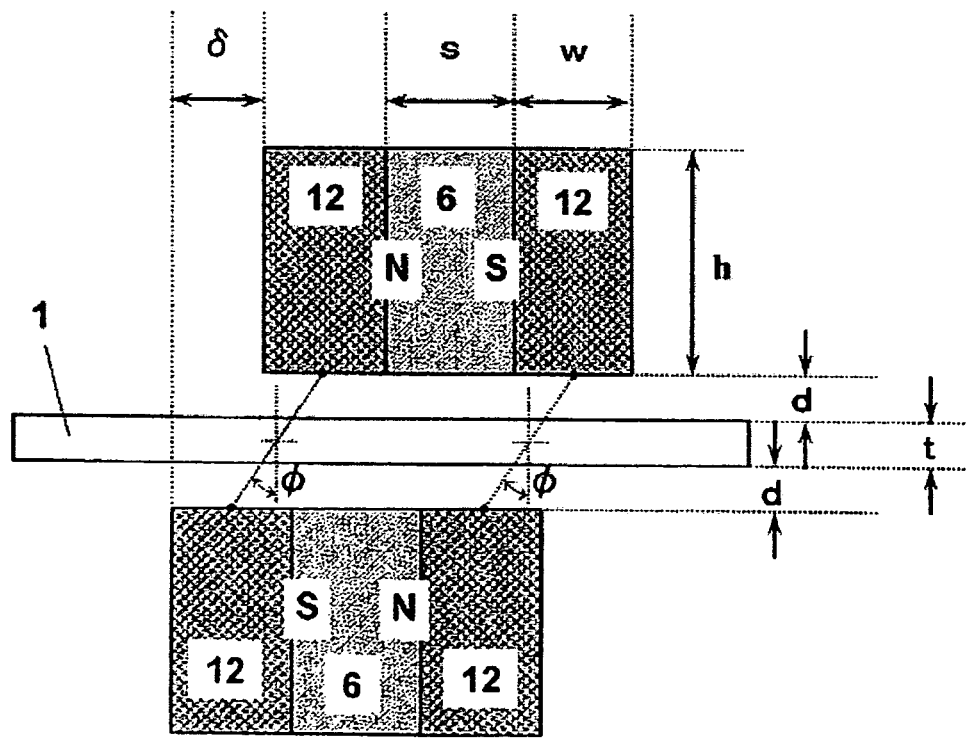
FIG. 15 is a schematic diagram showing another example of magnet configuration.
Figure 16:
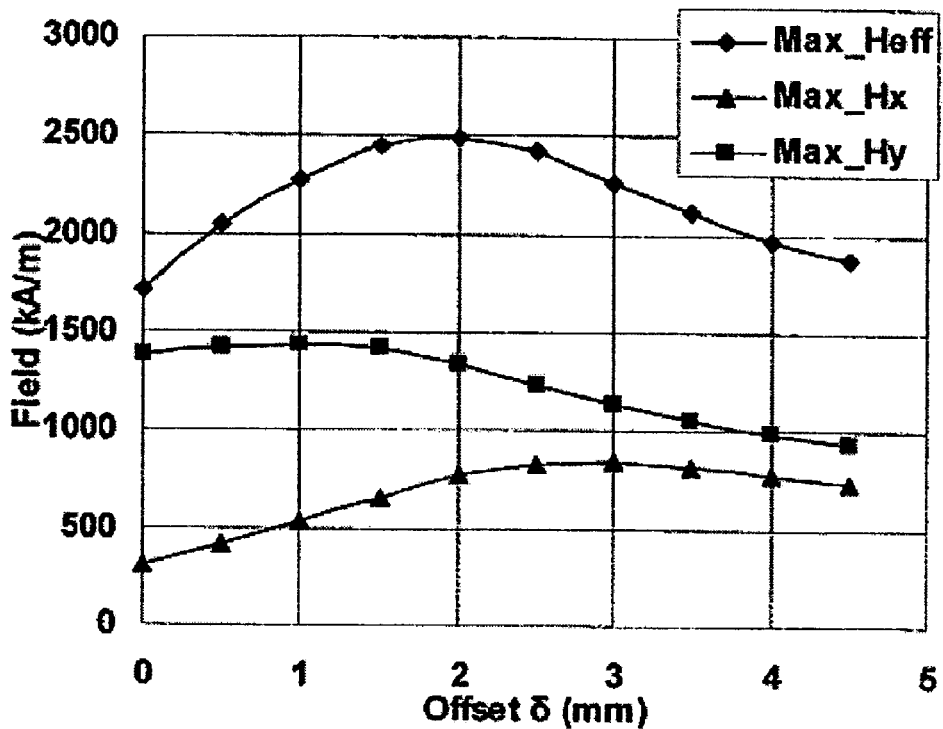
FIG. 16 is a graph showing the effective magnetic field's dependence on offset values.

Another configuration of the magnets, as shown in FIG. 15, was reviewed by use of a numerical analysis. In place of 4 pieces of the permanent magnets shown in the foregoing, soft magnetic materials 12 with Bs=2.0 (T), and initial permeability $\mu_0$=8300 are disposed above, and below a medium plane, and between the soft magnetic materials 12, there is disposed a permanent magnet 6 of width s=5.0 (mm), height h=5.0 (mm), and Br=1.3 (T). A direction of magnetization of the permanent magnet is in parallel with the medium plane, and the respective permanent magnets, above and below the medium plane, are reversed in polarity from each other. FIG. 16 shows a relationship of magnetic fields applied against offset values $\delta$ in this case. It is shown in FIG. 16 that in the case of the configuration of the magnets being as shown in FIG. 15, an effective magnetic field comes to be at its maximum value at the offset value $\delta$=2.0 mm ($\Phi$=58 deg.). Thus, it is obvious that even in the case of employing a magnet configuration in combination with the soft magnetic materials, if an optimum offset value is set, there is obtained an effect of improvement of the effective magnetic field strength about 1.5 times over that for the case where no offset is provided.

Figure 17:
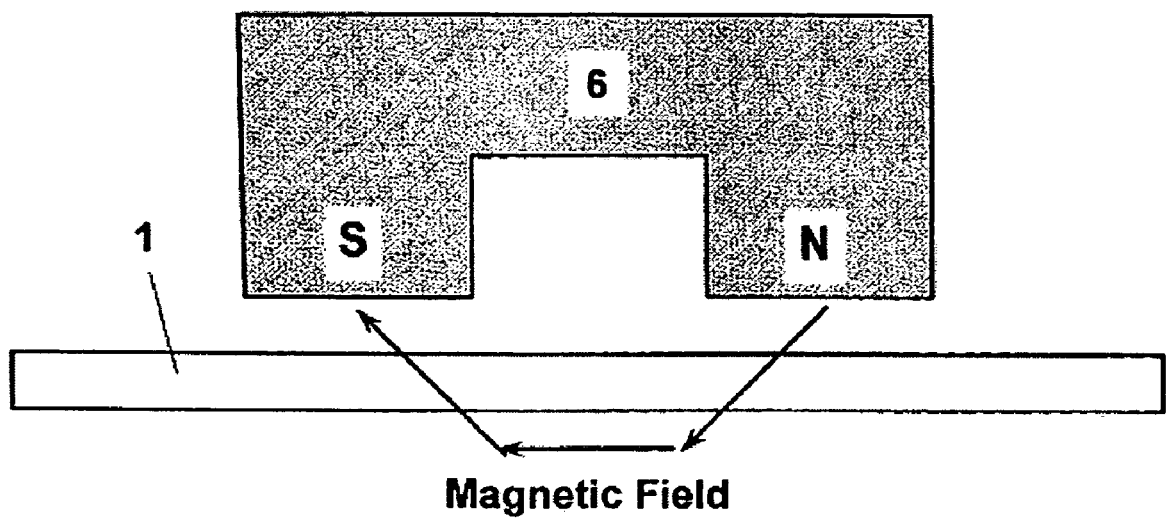
FIG. 17 is a schematic diagram showing still another example of magnet configuration.

Furthermore, even if a magnet is disposed on one face of a medium, as shown in FIG. 17, without necessarily disposing magnets on the top side, and underside of the medium, respectively, there is also a possibility that slanted magnetic fields can be applied to a recording layer by optimally adjusting a shape of the magnet, and a distance between magnetic poles.

Figure 29:
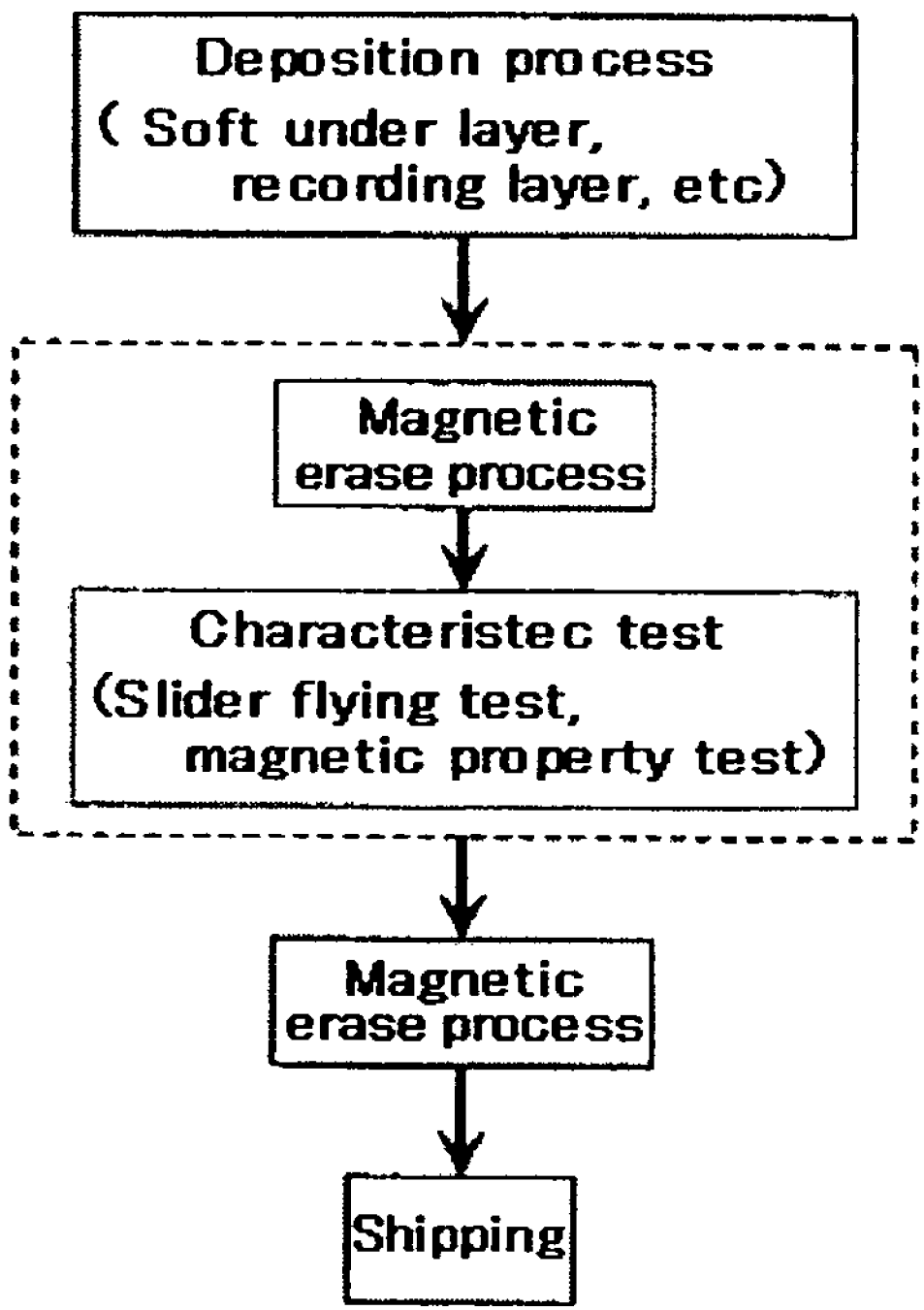
FIG. 29 is a block diagram showing a process for fabrication of the medium.

FIG. 29 is a block diagram showing a simplified process from fabrication of a magnetic recording medium to shipment thereof, including a demagnetization step. The double-layered perpendicular magnetic recording medium is generally fabricated by stacking magnetic films such as an underlying layer, a recording layer, and so forth, and nonmagnetic films, such as a protection layer, and so forth, on top of a substrate plane. Thereafter, there are conducted tests on flatness of the surface of the medium, contributing to flyability of a slider, and magnetic characteristics of the recording layer, contributing to write/read characteristics of a head by carrying out 100% inspection, or sampling inspection, and media having passed those tests are shipped out. At this point in time, if shipment is made of the media in a state where magnetization that has occurred at the time of forming the films or due to the tests on the magnetic characteristics is left out, this will raise a possibility that there occurs troubles with the write/read characteristics, and so forth when the medium is mounted in the magnetic recorder, as described in the foregoing, and a condition of the recording layer will come to vary for every medium, so that a product lacks in uniformity. In order to avoid such problems, it becomes essential to have a step of demagnetizing the recording layer of the medium before the shipment of the medium. Further, the demagnetization step is essential in order to ensure uniformity at the time of the tests on the magnetic characteristics. Since an apparatus for demagnetization, capable of implementing reliable and even demagnetization with any media, such as a medium with a high coercive force, and so forth, is required in carrying out the demagnetization step, application of the invention is effective. That is, in the demagnetization step for demagnetizing a perpendicular magnetic recording layer after the film forming step for forming the soft magnetic under layer, and the perpendicular magnetic recording layer by stacking them on the substrate, magnetic fields with alternate polarity in a direction slanting to the direction of the easy axis of magnetization of the perpendicular magnetic recording layer are applied, thereby effecting alternating-current demagnetization. At this point in time, the magnetic fields with alternate polarity are preferably applied so as to be tilted by about 15 to 75 degrees toward the track direction from the direction normal to the medium plane, as described in the foregoing.

Figure 18:
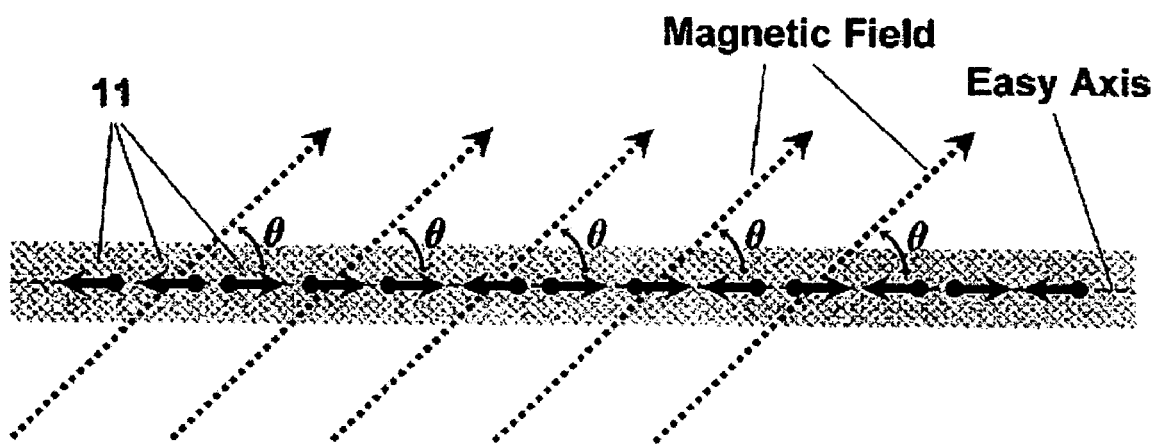
FIG. 18 is a schematic illustration of slanted magnetic fields applied to the longitudinal magnetic recording medium, according to an embodiment of the invention.
Figure 19:
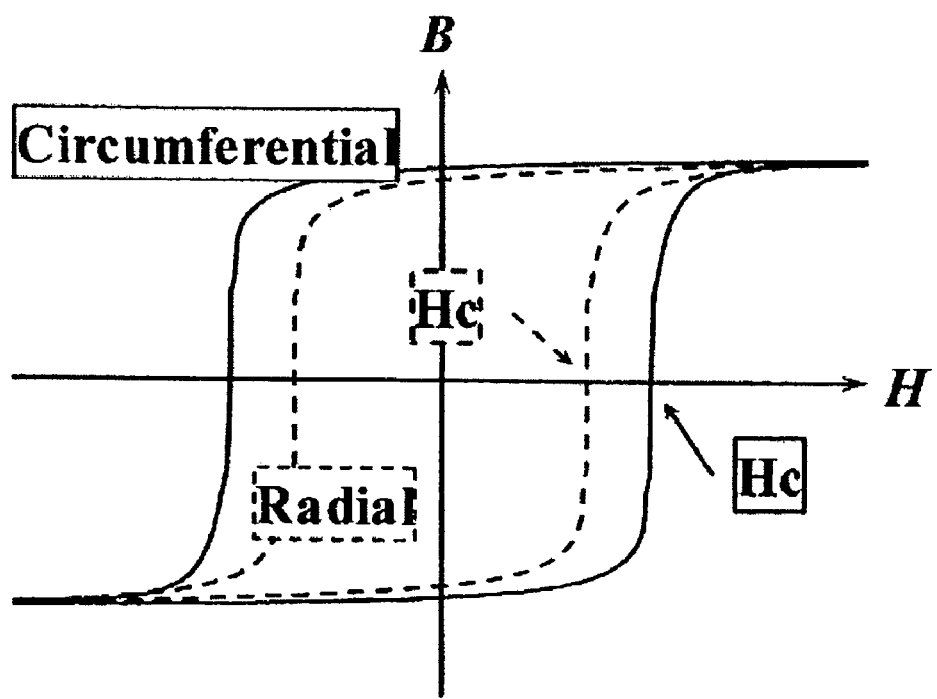
FIG. 19 is a diagram showing a B-H loop of the longitudinal magnetic recording medium.
Figure 20:
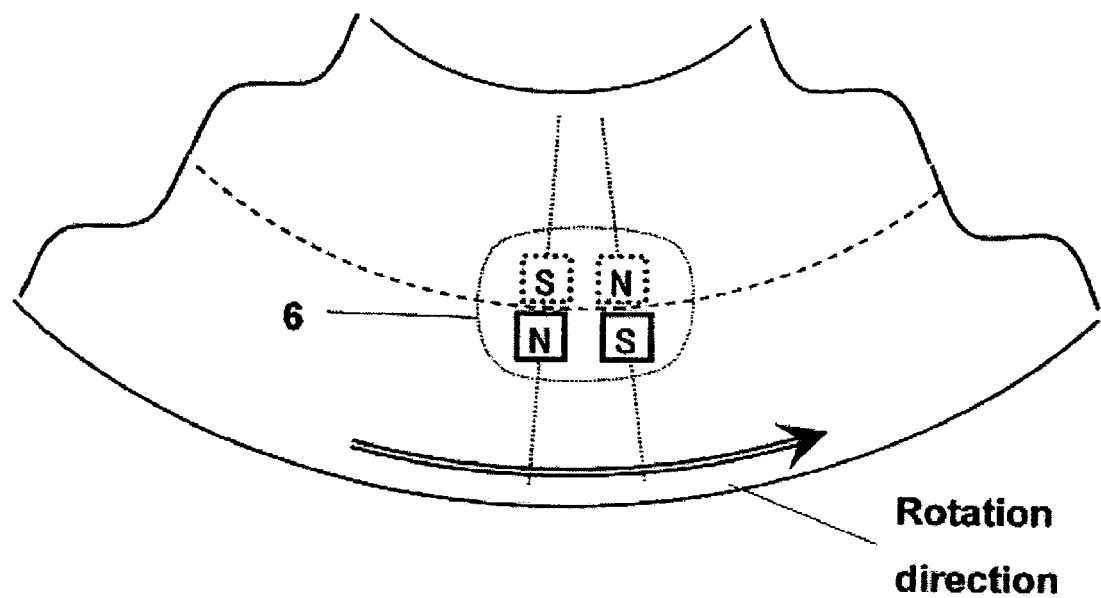
FIG. 20 is a schematic diagram showing a magnet disposition example suitable for the longitudinal medium.

The alternating-current magnetic demagnetization of the perpendicular magnetic recording medium has so far been primarily described, however, the invention is applicable to the longitudinal magnetic recording medium as well, in which case, improvement in efficiency can be similarly obtained. When a magnet configuration shown in FIGS. 4 to 6 is adopted for the longitudinal magnetic recording medium, magnet fields in a direction slanting to the direction of the easy axis of magnetization are applied to the recording layer of the medium, as shown in FIG. 18, so that improvement in demagnetization efficiency can be expected as with the case of the perpendicular magnetic recording medium. Further, with the longitudinal magnetic recording medium, magnetic anisotropy of the recording layer is somewhat oriented in the circumferential direction by use of a technique for forming the magnetic layers on a texture-formed surface of a medium substrate, and so forth. Accordingly, as shown in FIG. 19, a B-H loop of the recording layer, in the circumferential direction (solid line), differs in shape from that in the radial direction (broken line), and magnetic coercivity Hc in the radial direction is smaller than that in the circumferential direction. Hence, when demagnetizing the medium, it is effective to apply longitudinal magnetic fields in the radial direction, and longitudinal components of the slanted magnetic fields according to the present invention are preferably oriented in the radial direction rather than in the circumferential direction. For this reason, as shown in, for example, FIG. 20, staggered directions of the respective permanent magnets 6 opposite to each other, with the medium interposed therebetween, are offset in the radial direction of the medium, thereby rendering the longitudinal components of the slanted magnetic fields to become magnetic fields in the radial direction, so that demagnetization can be implemented with higher efficiency.

The method, or apparatus for demagnetization, according to the invention, can be applied to a fabrication process for the longitudinal magnetic recording medium. In this case, during a demagnetization step for demagnetizing the longitudinal magnetic recording layer after a film forming step for forming the longitudinal recording layer on the substrate, magnetic fields with alternate polarity in a direction slanting to the direction of the easy axis of magnetization of the longitudinal magnetic recording layer are applied, thereby effecting alternating-current demagnetization. At this point in time, the magnetic fields with alternate polarity are preferably applied so as to be tilted by about 15 to 75 degrees toward the track direction from the direction normal to the medium plane, as described in the foregoing.

Figure 21:
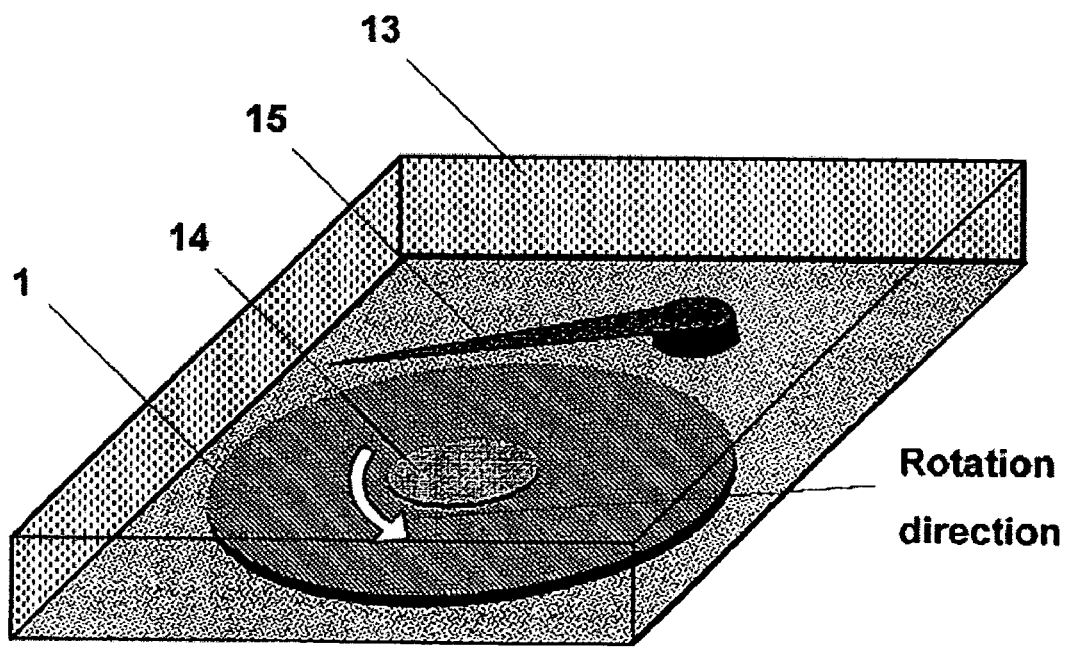
FIG. 21 is a schematic view of a magnetic recorder.
Figure 22:
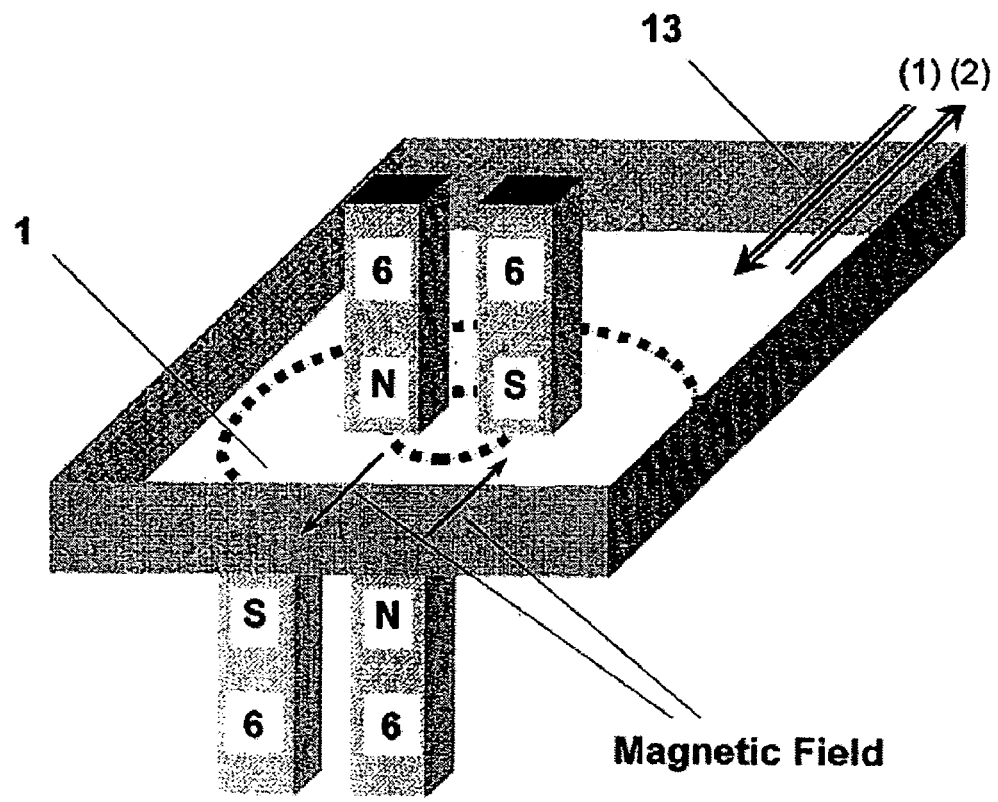
FIG. 22 is a schematic view showing implementation of alternating-current demagnetization of the medium mounted in the magnetic recorder.

Further, the invention is applicable when the magnetic recording medium 1 is mounted in a magnetic recorder. FIG. 21 is a schematic view of the magnetic recorder 13 with the magnetic recording medium 1 mounted therein. A spindle motor 14 for driving the magnetic recording medium 1 in rotation, a suspension 15 with a write/read magnetic head mounted at the tip thereof, and so forth are installed in the magnetic recorder 13. Alternating-current demagnetization can be implemented by applying the slanted magnetic fields according to the invention to the magnetic recording medium 1 from the outer side of the magnetic recorder 13, as shown in FIG. 22, while rotating the magnetic recording medium 1 with the use of the spindle motor 14. Furthermore, since a configuration of the permanent magnets 6 for applying the magnetic fields from outside the magnetic recorder 13 is expected to be large in dimensions, it is considered more efficient to move the magnetic recorder 13 in directions indicated by arrows (1), and (2), respectively, while the magnets are in a fixed state.

Figure 23:
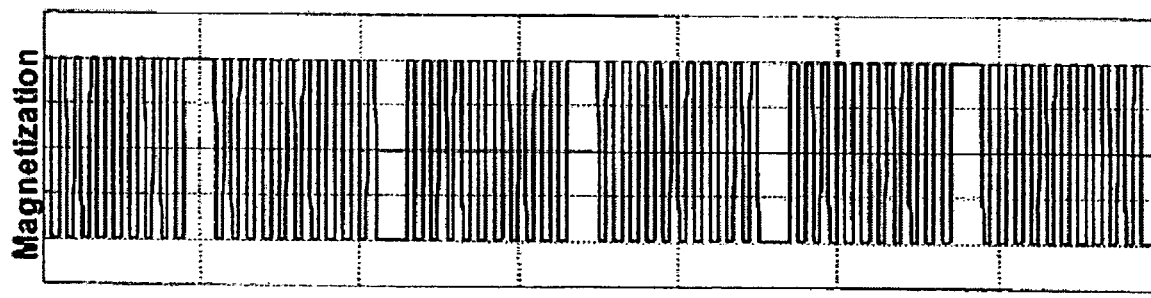
FIG. 23 is a diagram showing an example of a pattern recorded in magnetic recording media.
Figure 24:
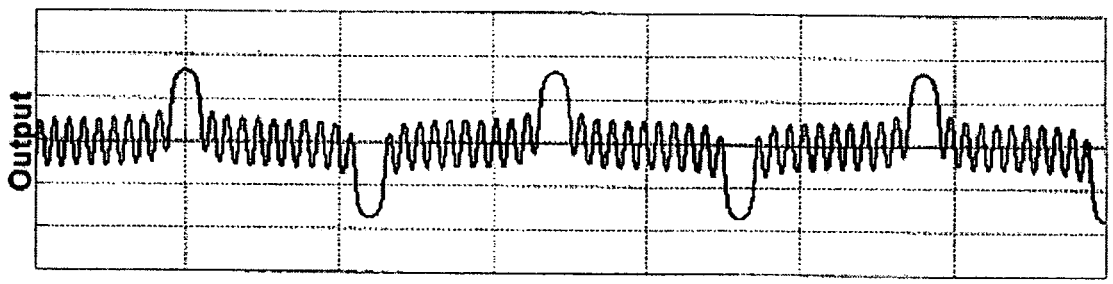
FIG. 24 is a reproducing waveform chart.
Figure 25:
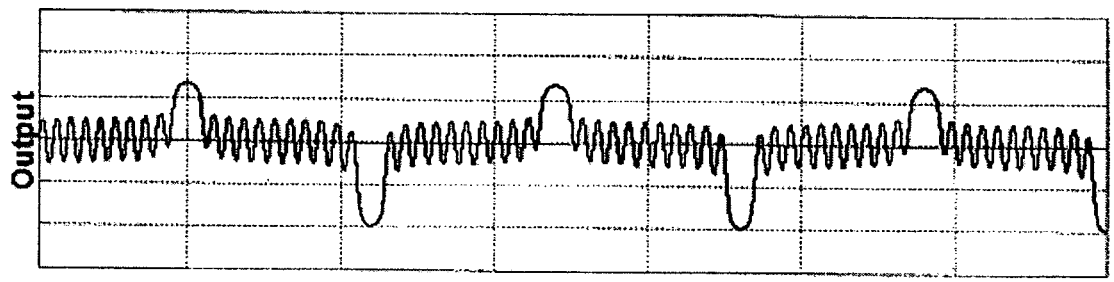
FIG. 25 is a reproducing waveform chart.

As described hereinbefore, with the invention, it is possible to efficiently implement the alternating-current demagnetization of the magnetic recording medium, thereby rendering remanent magnetization zero across the medium plane. Referring to FIGS. 23 to 25, there will be described the perpendicular magnetic recording medium that is incompletely demagnetized due to insufficiency in the magnetic fields applied according to a conventional technique, and so forth, and the perpendicular magnetic recording medium that is sufficiently demagnetized according to the invention. FIGS. 24 and 25 show reproducing waveforms, respectively, obtained when recording and reproducing a pattern for forming recording magnetization as shown in, for example, FIG. 23. FIG. 24 shows the reproducing waveform obtained when the alternating-current demagnetization is sufficiently attained, and FIG. 25 shows the reproducing waveform obtained when the alternating-current demagnetization is not applied or the reproducing waveform in regions where the alternating-current demagnetization is not sufficiently attained even though the alternating-current demagnetization is applied, so that the remanent magnetization has not been rendered zero. As show in FIG. 25, it can be confirmed that in the case of the reproducing waveform in which the remanent magnetization has not been rendered zero, the reproducing waveform contains distortions such as occurrence of a difference in amplitude between the respective waveforms on the plus side and minus side. This is attributable to reproducing distortions occurring due to shift in magnetization dislocation points at the time of recording, caused by magnetic fields produced by the remanent magnetization of the recording layer, and shift in the base-line of a reproducing element. The reproducing distortions pose a possibility of inducing deterioration in performance of the magnetic recorder, and so on, including problems with information for a servo at the time of recording and reproducing, and degradation in error rate. In contrast, with the medium sufficiently subjected to the alternating-current demagnetization according to the invention, it is possible to obtain the reproducing waveform without any distortion as show in FIG. 24, so that troubles otherwise occurring when using the magnetic recorder can be avoided.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A method of fabricating a perpendicular magnetic recording medium comprising:
   a film forming step of forming a soft magnetic under layer, and a perpendicular magnetic recording layer on top of a substrate; and
   a demagnetization step of demagnetizing the perpendicular magnetic recording layer, wherein in the demagnetization step, alternating-current demagnetization is implemented by applying magnetic fields with alternate polarity in a direction slanting to an easy direction of magnetization of the perpendicular magnetic recording layer;
   wherein the demagnetization step utilizes first magnets having a N-pole and S-pole, as respective magnetic poles thereof, facing a medium plane, and a second magnets having a S-pole and N-pole, as respective magnetic poles thereof, facing the medium plane;
   wherein the S-pole and the N-pole of the second magnets, respectively, are disposed so as to have an offset in a direction either orthogonal or parallel to the medium plane, against the N-pole and the S-pole of the first magnets, respectively.

2. A method of fabricating a perpendicular magnetic recording medium according to claim 1, wherein in the demagnetization step, regions for applying the magnetic fields with alternate polarity are moved from an outer peripheral side of the perpendicular magnetic recording medium toward an inner peripheral side thereof, or from the inner peripheral side thereof toward the outer peripheral side thereof while rotating the perpendicular magnetic recording medium.

3. A method of fabricating a perpendicular magnetic recording medium according to claim 2, wherein the magnetic fields with alternate polarity are applied so as to be tilted by 15 to 75 degrees toward a track direction from a direction normal to a medium plane.

4. A method of fabricating a perpendicular magnetic recording medium according to claim 1, wherein the magnetic fields with alternate polarity are produced by magnets in pairs of not less than two pairs, disposed with a medium plane sandwiched therebetween, so as to form an angle in the range of 15 to 75 degrees between a straight line interconnecting respective centers of two magnetic pole faces of the magnets opposite to each other, and a normal to the medium plane, the magnets being disposed so as to be arranged in a rotation direction of the medium such that polarities of respective magnet fields applied to the perpendicular magnetic recording medium are reversed from each other.

5. A method of demagnetizing a perpendicular magnetic recording medium having a soft magnetic under layer, and a perpendicular magnetic recording layer, formed on top of a substrate, said method comprising:
   applying magnetic fields with alternate polarity in a direction slanting to an easy direction of magnetization of the perpendicular magnetic recording layer while rotating the perpendicular magnetic recording medium; and
   moving regions for applying the magnetic fields with alternate polarity from an outer peripheral side of the perpendicular magnetic recording medium toward an inner peripheral side thereof, or from the inner peripheral side thereof toward the outer peripheral side thereof;
   wherein demagnetizing includes first magnets having a N-pole and S-pole, as respective magnetic poles thereof, facing a medium plane, and a second magnets having a S-pole and N-pole, as respective magnetic poles thereof, facing the medium plane;
   wherein the S-pole and the N-pole of the second magnets, respectively, are disposed so as to have an offset in a direction either orthogonal or parallel to the medium plane, against the N-pole and the S-pole of the first magnets, respectively.

6. A method of demagnetizing a perpendicular magnetic recording medium according to claim 5, wherein the magnetic fields with alternate polarity are applied so as to be tilted by 15 to 75 degrees toward a track direction from a direction normal to a medium plane.

7. A method of demagnetizing a perpendicular magnetic recording medium according to claim 5, wherein the magnetic fields with alternate polarity are produced by magnets in pairs of not less than two pairs, disposed with the medium plane sandwiched therebetween, so as to form an angle in the range of 15 to 75 degrees between a straight line interconnecting respective centers of two magnetic pole faces of the magnets opposite to each other, and a normal to the medium plane, the magnets being disposed so as to be arranged in a rotation direction of the medium such that polarities of respective magnet fields applied to the perpendicular magnetic recording medium are reversed from each other.

8. An apparatus for demagnetizing a perpendicular magnetic recording medium comprising:
   first magnets having N-pole and S-pole, as respective magnetic poles thereof, facing a medium plane;
   second magnets having S-pole and N-pole, as respective magnetic poles thereof, facing the medium plane;
   a first member movable while holding the first magnets;
   a second member movable while holding the second magnets; and
   a driver configured to move the first member and the second member, while keeping a relative positional relationship between the first magnets and the second magnets, wherein the N-pole and the S-pole of the first magnets, respectively, and the S-pole and the N-pole of the second magnets, respectively, are disposed in directions orthogonal to respective moving directions of the first member and the second member, a gap for inserting a magnetic recording medium therein is provided between the first magnets and the second magnets, and the S-pole and the N-pole of the second magnets, respectively, are disposed so as to have an offset in the directions orthogonal to the respective moving directions of the first member and the second member, against the N-pole and the S-pole of the first magnets, respectively.

9. An apparatus for demagnetizing a perpendicular magnetic recording medium according to claim 8, wherein the offset is set so as to form an angle in the range of 15 to 75 degrees between a straight line, interconnecting the center of the N-pole of one of the first magnets, and the center of the S-pole of the second magnet opposite to the one of the first magnets, and interconnecting the center of the S-pole of the other of the first magnets, and the center of the N-pole of the second magnet opposite to the other of the first magnets, respectively, and the normal to a plane of the perpendicular magnetic recording medium inserted in the gap.

10. A method of demagnetizing a longitudinal magnetic recording medium having a longitudinal magnetic recording layer formed on top of a substrate, said method comprising:
    applying magnetic fields with alternate polarity in a direction slanting to an easy direction of magnetization of the longitudinal magnetic recording layer while rotating the longitudinal magnetic recording medium; and
    moving regions for applying the magnetic fields with alternate polarity from an outer peripheral side of the longitudinal magnetic recording medium toward an inner peripheral side thereof, or from the inner peripheral side thereof toward the outer peripheral side thereof;
    wherein demagnetizing includes first magnets having a N-pole and S-pole, as respective magnetic poles thereof, facing a medium plane, and a second magnets having a S-pole and N-pole, as respective magnetic poles thereof, facing the medium plane;
    wherein the S-pole and the N-pole of the second magnets, respectively, are disposed so as to have an offset in a direction either orthogonal or parallel to the medium plane, against the N-pole and the S-pole of the first magnets, respectively.

11. A method of demagnetizing a longitudinal magnetic recording medium according to claim 10, wherein the magnetic fields with alternate polarity are applied so as to be tilted by 15 to 75 degrees from a direction normal to a medium plane.

12. A method of demagnetizing a longitudinal magnetic recording medium according to claim 10, wherein the magnetic fields with alternate polarity are produced by magnets in pairs of not less than two pairs, disposed with the medium plane sandwiched therebetween, so as to form an angle in the range of 15 to 75 degrees between a straight line interconnecting the respective centers of two magnetic pole faces of the magnets opposite to each other, and the normal to the medium plane, the magnets being disposed so as to be arranged in a rotation direction of the medium such that polarities of respective magnet fields applied to the longitudinal magnetic recording medium are reversed from each other.

13. An apparatus for demagnetizing a longitudinal magnetic recording medium comprising:
    first magnets having N-pole and S-pole, as respective magnetic poles thereof, facing a medium plane;
    second magnets having S-pole and N-pole, as respective magnetic poles thereof, facing the medium plane;
    a first member movable while holding the first magnets;
    a second member movable while holding the second magnets; and
    a driver configured to move the first member and the second member, while keeping a relative positional relationship between the first magnets and the second magnets, wherein a gap for inserting a magnetic recording medium therein is provided between the first magnets and the second magnets, and the S-pole and the N-pole of the second magnets, respectively, are disposed so as to have an offset in a direction parallel with a medium plane of the magnetic recording medium inserted in the gap, against the N-pole and the S-pole of the first magnets, respectively.

14. An apparatus for demagnetizing a longitudinal magnetic recording medium according to claim 13, wherein the N-pole and the S-pole of the first magnets, respectively, and the S-pole and the N-pole of the second magnets, respectively, are disposed in directions orthogonal to respective moving directions of the first member and the second member, and the S-pole and the N-pole of the second magnets, respectively, are disposed so as to have an offset in the respective moving directions of the first member and the second member, against the N-pole and the S-pole of the first magnets, respectively.

15. An apparatus for demagnetizing a longitudinal magnetic recording medium according to claim 13, wherein the offset is set so as to form an angle in the range of 15 to 75 degrees between a straight line interconnecting the center of the N-pole of one of the first magnets, and the center of the S-pole of the second magnet opposite to the one of the first magnets, and interconnecting the center of the S-pole of the other of the first magnets, and the center of the N-pole of the second magnet opposite to the other of the first magnets, respectively, and the normal to a plane of the longitudinal magnetic recording medium inserted in the gap.

16. A method of fabricating a longitudinal magnetic recording medium comprising:
    a film forming step of forming a longitudinal magnetic recording layer on top of a substrate; and
    a demagnetization step of demagnetizing the longitudinal magnetic recording layer, wherein in the demagnetization step, alternating-current demagnetization is implemented by applying magnetic fields with alternate polarity in a direction slanting to an easy direction of magnetization of the longitudinal magnetic recording;
    wherein demagnetizing includes first magnets having a N-pole and S-pole, as respective magnetic poles thereof, facing a medium plane, and a second magnets having a S-pole and N-pole, as respective magnetic poles thereof, facing the medium plane;
    wherein the S-pole and the N-pole of the second magnets, respectively, are disposed so as to have an offset in a direction either orthogonal or parallel to the medium plane, against the N-pole and the S-pole of the first magnets, respectively.

17. A method of fabricating a longitudinal magnetic recording medium according to claim 16, wherein in the demagnetization step, regions for applying the magnetic fields with alternate polarity are moved from an outer peripheral side of the longitudinal magnetic recording medium toward an inner peripheral side thereof, or from the inner peripheral side thereof toward the outer peripheral side thereof while rotating the longitudinal magnetic recording medium.

18. A method of fabricating a longitudinal magnetic recording medium according to claim 17, wherein the magnetic fields with alternate polarity are applied so as to be tilted by 15 to 75 degrees from a direction normal to a medium plane.

19. A method of fabricating a longitudinal magnetic recording medium according to claim 16, wherein the magnetic fields with alternate polarity are produced by magnets in pairs of not less than two pairs, disposed with a medium plane sandwiched therebetween, so as to form an angle in the range of 15 to 75 degrees between a straight line interconnecting the respective centers of two magnetic pole faces of the magnets opposite to each other, and the normal to the medium plane, the magnets being disposed so as to be arranged in a rotation direction of the medium such that polarities of respective magnet fields applied to the longitudinal magnetic recording medium are reversed from each other.

* * * * *